(12) United States Patent
Klein

(10) Patent No.: US 12,046,855 B2
(45) Date of Patent: Jul. 23, 2024

(54) WELDING POWER CABLE FOR CONNECTING TO A WELDING POWER SOURCE IN ORDER TO CARRY OUT AN ARC WELDING METHOD

(71) Applicant: SKS WELDING SYSTEMS GMBH, Kaiserslautern (DE)

(72) Inventor: Thomas Klein, Rodenbach (DE)

(73) Assignee: SKS WELDING SYSTEMS GMBH, Kaiserslautern (DE)

( * ) Notice: Subject to any disclaimer, the term of this patent is extended or adjusted under 35 U.S.C. 154(b) by 970 days.

(21) Appl. No.: 16/649,633

(22) PCT Filed: Sep. 22, 2018

(86) PCT No.: PCT/EP2018/000443
§ 371 (c)(1),
(2) Date: Aug. 29, 2020

(87) PCT Pub. No.: WO2019/057331
PCT Pub. Date: Mar. 28, 2019

(65) Prior Publication Data
US 2020/0395711 A1    Dec. 17, 2020

(30) Foreign Application Priority Data
Sep. 22, 2017    (DE) ...................... 10 2017 009 142.0

(51) Int. Cl.
*H01R 13/625*    (2006.01)
*B23K 9/16*    (2006.01)
(Continued)

(52) U.S. Cl.
CPC ............. *H01R 13/625* (2013.01); *B23K 9/16* (2013.01); *B23K 9/323* (2013.01); *H01R 9/11* (2013.01);
(Continued)

(58) Field of Classification Search
CPC ... H01L 23/49575; H01L 24/48; H01L 24/73; H01L 25/16; H01L 2224/48245;
(Continued)

(56) References Cited

U.S. PATENT DOCUMENTS

2014/0038442 A1* 2/2014 Hung .................... B23K 9/323
                                                    439/191
2016/0266326 A1* 9/2016 Gniadek .............. G02B 6/3817

FOREIGN PATENT DOCUMENTS

DE    1747118 U    6/1957
EP    2937946 A1    10/2015

* cited by examiner

*Primary Examiner* — Robert G Bachner
(74) *Attorney, Agent, or Firm* — TAROLLI, SUNDHEIM, COVELL & TUMMINO L.L.P.

(57) ABSTRACT

A welding power cable includes at least one welding power source, a welding torch, and a workpiece. The welding power cable is provided with an outer casing for protecting and insulating an electrically conductive cable, wherein the electrically conductive cable is situated within the casing. The end face of the welding power cable is provided with an electrically conductive contacting means for establishing an electrically conductive contact with the welding power source in particular, and a connection means for establishing a detachable mechanical connection, in particular between the welding power source and the welding power cable. This provides an option for connecting and disconnecting such a welding power cable to/from a welding power source in a quick and reliable manner while keeping the torsional stress on the welding power cable in the area of the connection to the welding power source.

11 Claims, 8 Drawing Sheets

(51) Int. Cl.
  *B23K 9/32* (2006.01)
  *H01R 9/11* (2006.01)
  *H01R 13/56* (2006.01)
  *H01R 24/00* (2011.01)
  *H01R 24/20* (2011.01)
  *H01R 101/00* (2006.01)

(52) U.S. Cl.
  CPC ......... *H01R 13/565* (2013.01); *H01R 24/005* (2013.01); *H01R 24/20* (2013.01); *H01R 2101/00* (2013.01)

(58) Field of Classification Search
  CPC ... H01L 2224/73265; H01L 2924/1033; H01L 2924/1425; H01L 23/49541; H01L 24/06; H01L 24/13; H01L 24/37; H01L 24/49; H01L 2224/04042; H01L 2224/05554; H01L 2224/0616; H01L 2224/13101; H01L 2224/1329; H01L 2224/371; H01L 2224/45124; H01L 2224/45139; H01L 2224/45144; H01L 2224/45147; H01L 2224/48091; H01L 2224/4811; H01L 2224/48137; H01L 2224/48145; H01L 2224/48247; H01L 2224/48257; H01L 2224/49052; H01L 2224/49113; H01L 2224/4917; H01L 2224/49171; H01L 2224/49431; H01L 2924/00014; H01L 2924/10253; H01L 2924/12035; H01L 2924/1306; H01L 2924/1426; H01L 2924/181; H01L 23/3677; H01L 23/49562
  See application file for complete search history.

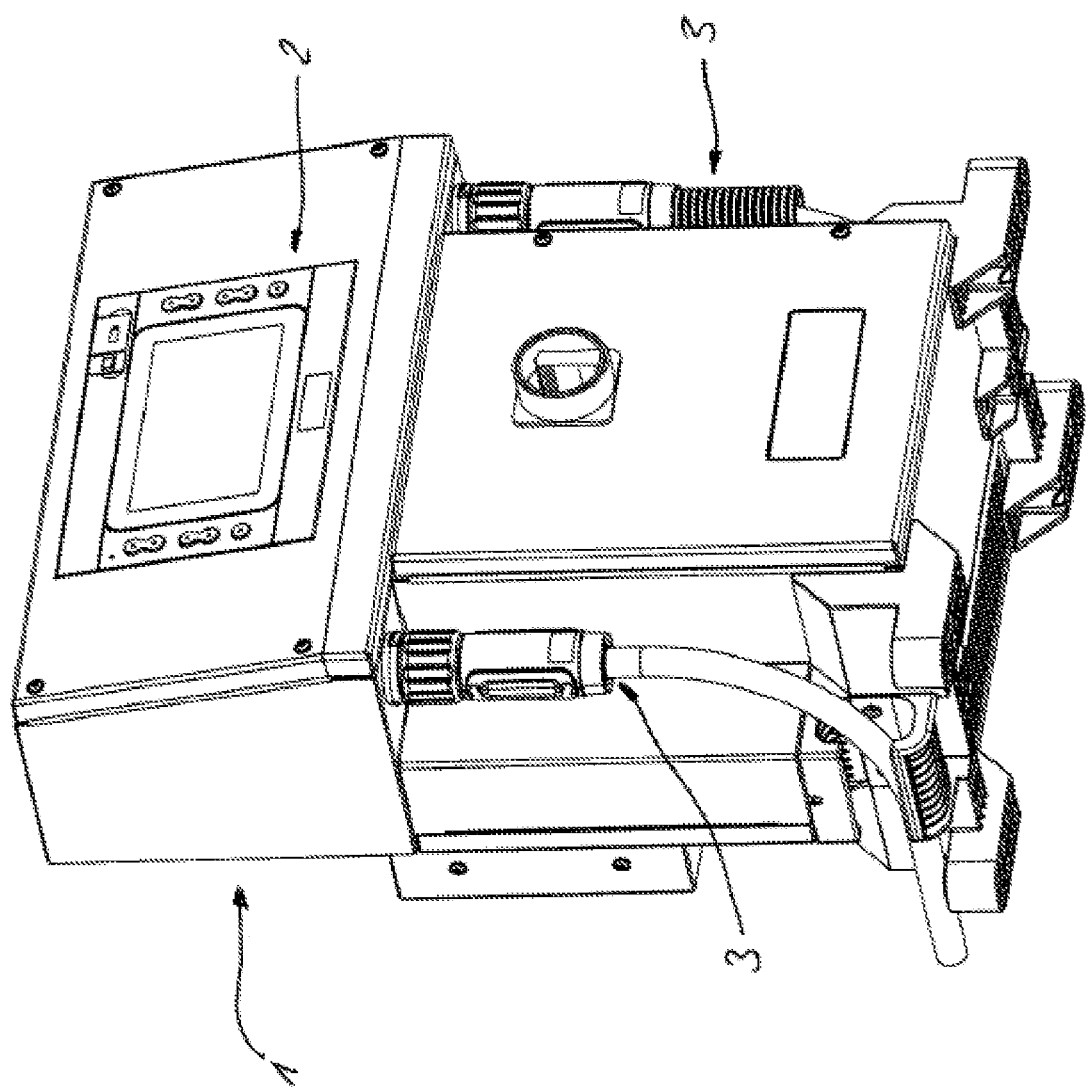

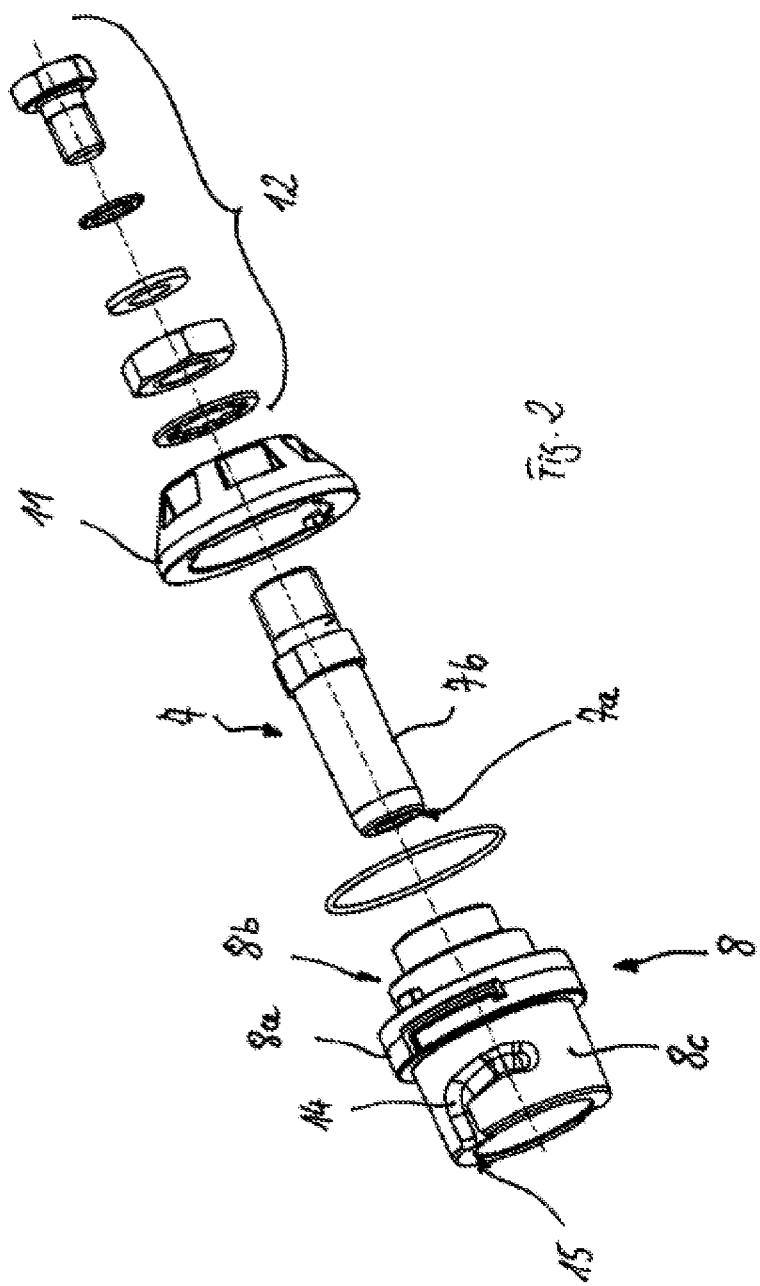

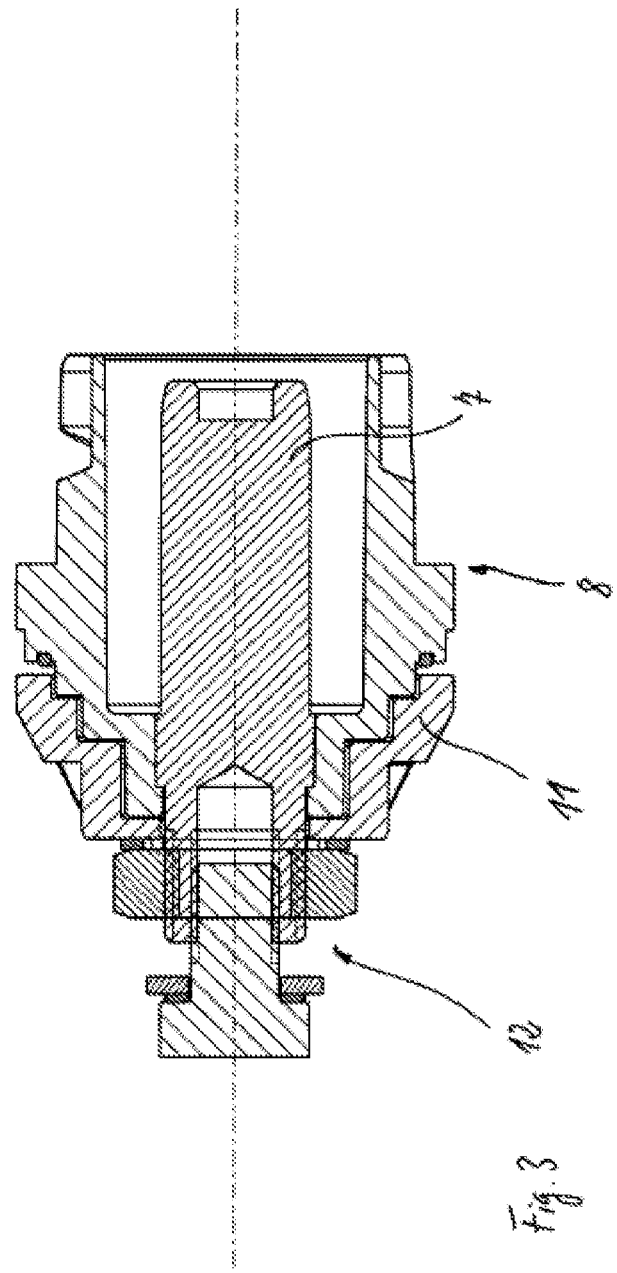

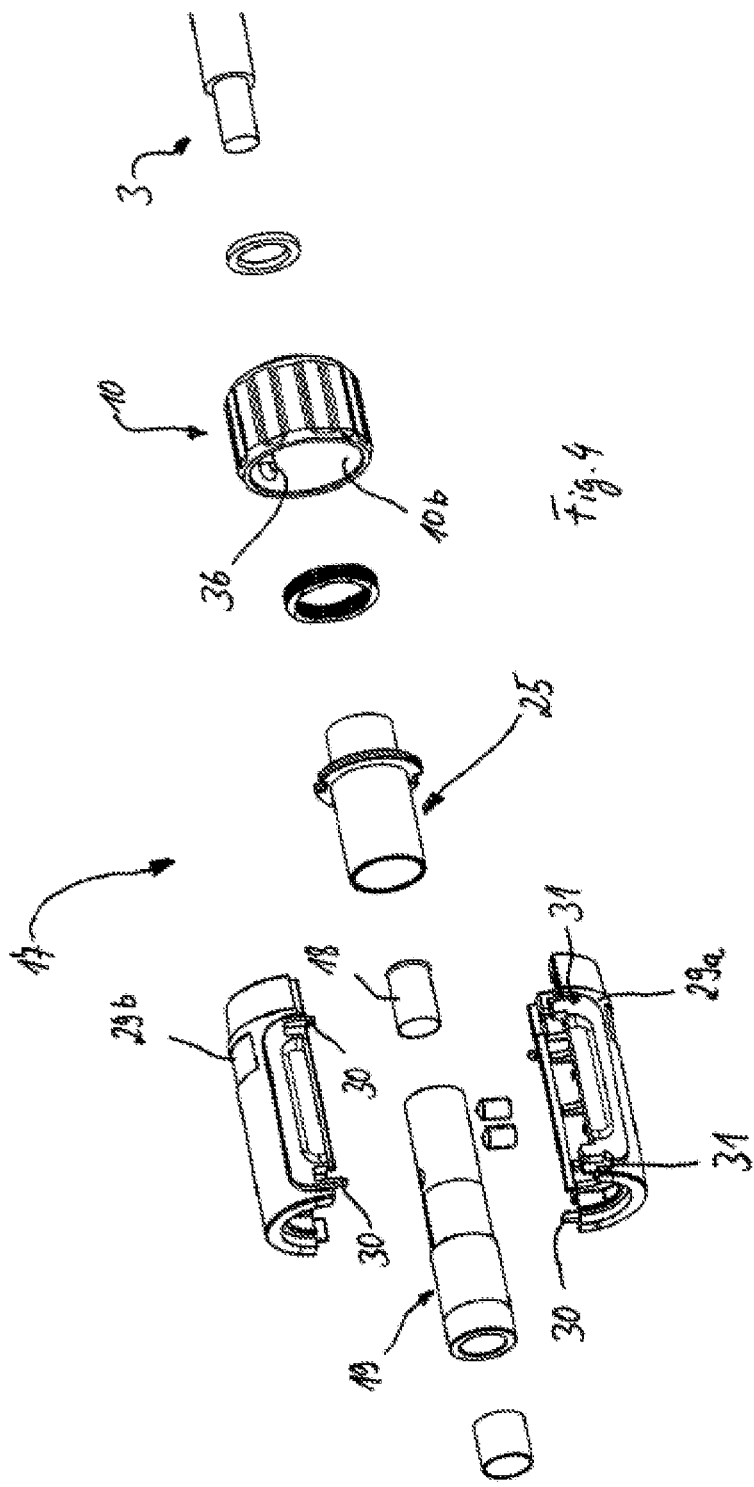

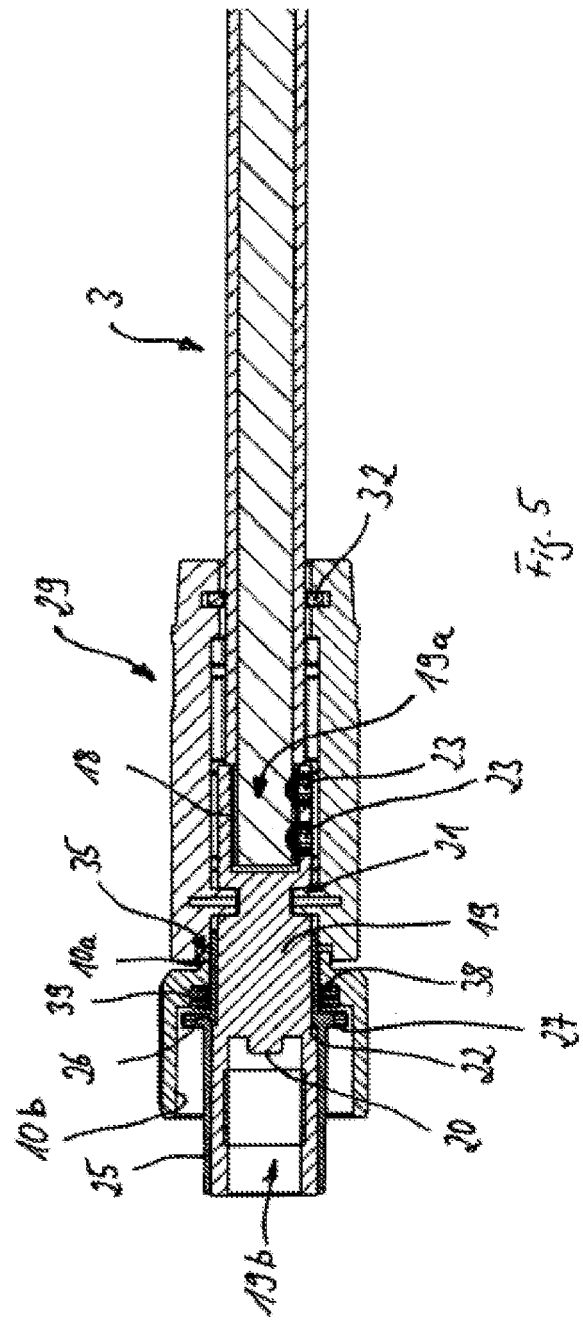

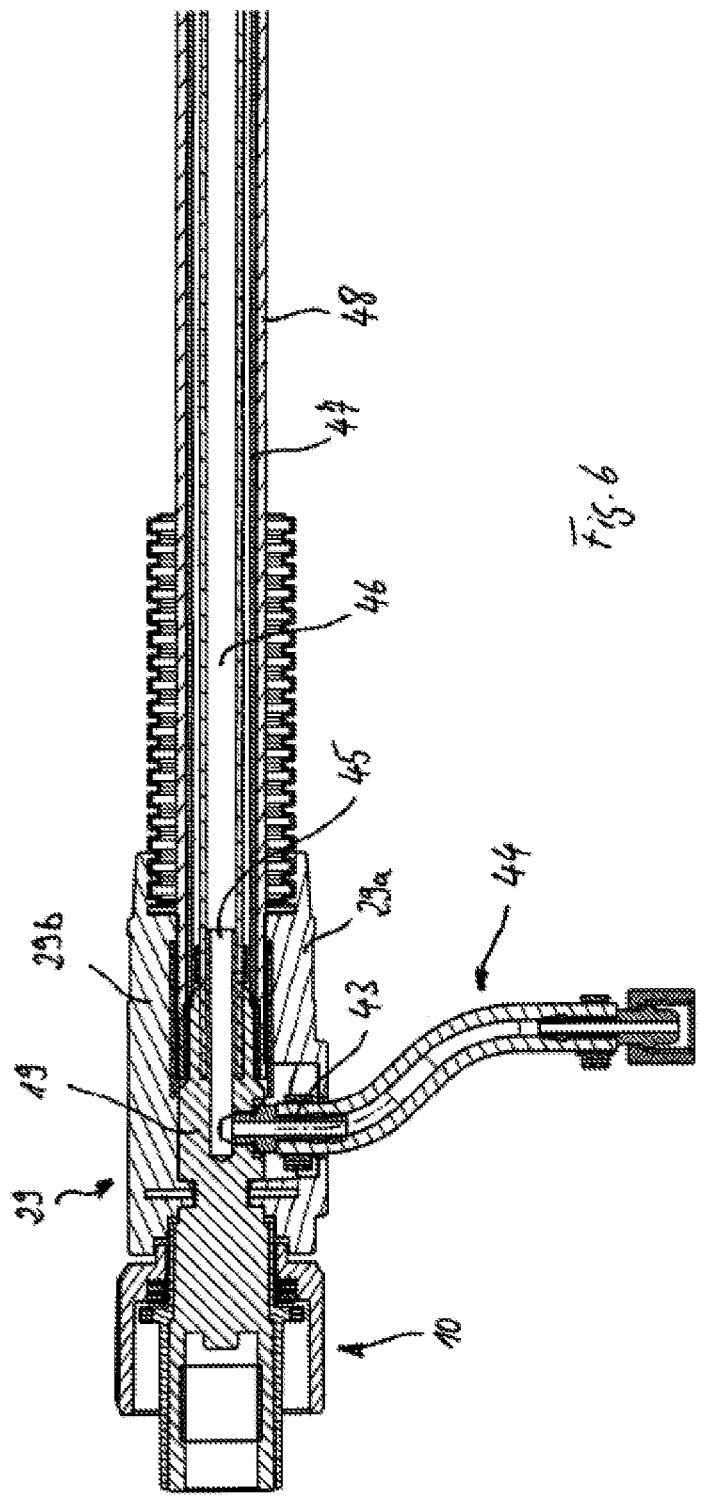

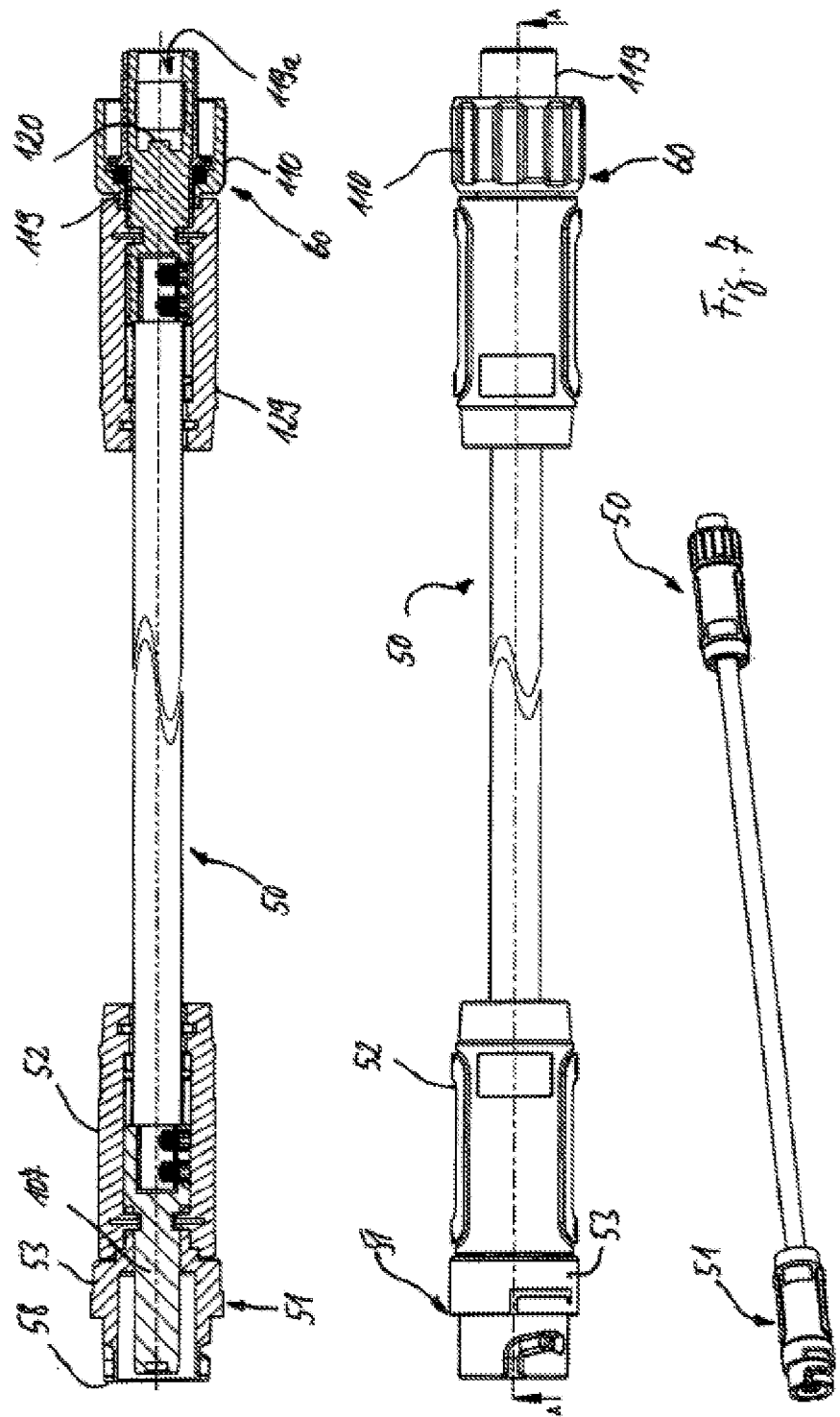

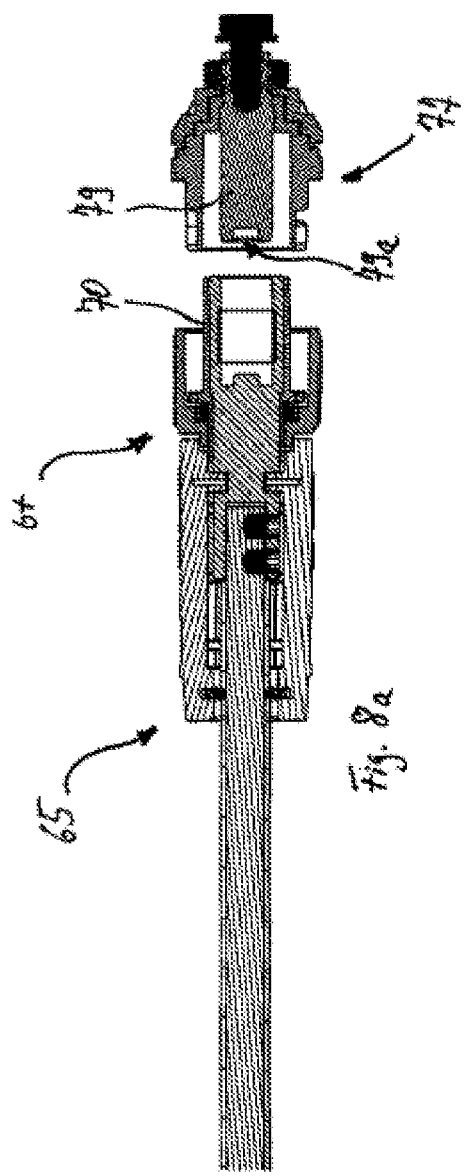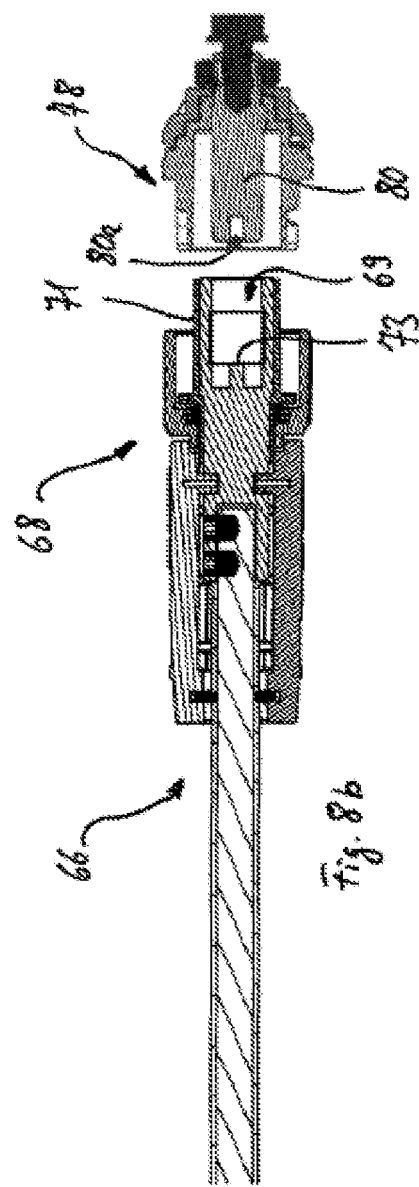

WELDING POWER CABLE FOR CONNECTING TO A WELDING POWER SOURCE IN ORDER TO CARRY OUT AN ARC WELDING METHOD

RELATED APPLICATIONS

The present invention is a U.S. National Stage under 35 USC 371 patent application, claiming priority to Serial No. PCT/EP2018/000443, filed on 22 Sep. 2018; which claims priority of DE 102017009142.0, filed on 22 Sep. 2017, the entirety of both of which are incorporated herein by reference.

The invention relates to a welding power cable for connecting to a welding power source, the welding power cable being provided with an outer protective and insulating sleeve, and with an electrically conductive cable, situated inside the sleeve, which at an end face of the welding power cable is connected to an electrically conductive contact piece, and also including an electrical contacting means for establishing an electrically conductive contact with the welding power source, and including a connection means for establishing a detachable mechanical connection between the welding power source and the welding power cable.

There are numerous different welding methods. The present invention has particular importance for the various arc welding methods. These methods are based on heat generation by an electrical arc between a welding electrode and a workpiece on which welding is to be performed. The material(s) to be welded may be locally melted due to the heat generation. For this purpose, in practically all arc welding methods the area of the arc is supplied with a shielding gas, on the one hand to allow a resistance-lowering ionized atmosphere between the welding electrode and the workpiece, and on the other hand to prevent oxidation of the welding electrode and of the workpiece. Instead of an inert gas that is provided as a shielding gas, an active gas or a mixed form that is used for the reaction may be supplied. Likewise, electrodes may be provided that require no external gas supply, since the substances necessary for this purpose are integrated into the electrodes and are released when the electrodes melt.

An arc welding torch is typically designed in such a way that a user or a robot may direct a metal welding rod, which may also be referred to as a metal filler material, to a specified joining point on the target metal piece. The welding rod is guided by the welding torch, and is ultimately transported to the target metal piece through an opening in the contact tip at the end of the welding torch.

When a voltage is applied to a welding torch inner tube and the welding rod is contacted with the target metal piece, a high electrical current flows from a welding torch inner tube via a so-called nozzle holder, then via the contact tip, via the welding rod and optionally an arc, to the target metal piece and then to ground. The high current and the arc cause the welding rod to melt in a shielding gas atmosphere, resulting in droplet formation on the rod and generation of an arc.

This arc melts the metal of the target metal pieces and the subsequently guided welding rod. Falling of the created droplets of the welding rod or short circuit transfer of the droplets to the liquefied site on the target metal pieces results in coalescence of these droplets.

For supplying the necessary electrical current and voltage, arc welding facilities are provided with a welding power source with which the welding torch of the arc welding facility must be electroconductively connected so that the particular arc welding point may be supplied with current and a voltage may applied to it. This connection is generally established by means of welding power cables, a welding power cable being provided for each of the two poles of the particular welding power source. Thus, in addition to a connection to the welding torch, it is also necessary to connect the particular welding cable to the welding power source. In order to supply welding media, such as shielding gas and/or a welding rod, to the process point, based on the particular welding method, this may likewise take place via one of the two welding power cables, in particular by means of a coaxial welding power cable having a central passage for welding media. The present invention further relates to welding power cables with or also without an integrated media supply.

In particular, but not exclusively, in conjunction with automatic arc welding machines that guide and move an arc welding torch in multiple axes, generic welding cables may be subjected to very intense mechanical stress. Such a typical, frequently occurring movement also includes a rotation of the arc welding torch and of the cable about a rotational axis, resulting in twisting/torsion of the cable. Rotationally directed restoring forces thus build up in the welding power cable that act on the connecting point of the welding power cable to the welding power source, and that in principle are able to disconnect or at least loosen a welding power cable from the welding power source or from an extension cable of the welding power cable. Therefore, precautions must be taken so that these connections are not readily detachable. In addition, such torsional stresses on the welding power cables, in particular when accompanied by operation-related dynamic constant loads, may result in cable breaks.

High stress on such welding power cables also results from the prevailing heat as well as possible weld spatters that may fall on the welding power cable. Such welding power cables therefore generally have a solid, comparatively rigid, resistant design, which then results in a particularly high restoring torque on such cables when there is torsion about the longitudinal axis of the cable. The acting restoring torques and restoring forces also have an effect on the connections of the welding power cables to the welding power source, or to extension cables that are inserted between a welding power cable and the welding power source.

A standard, namely, the DIN EN 60974-12 standard, exists for connections of welding power cables to a welding power source. This standard describes a plug-in connection between a welding power cable and a pole contact device of a welding power source, in which locking is to be achieved by moving a locking bolt in a groove. According to Annex A of the referenced standard, the groove that is introduced into a socket for guiding the locking bolt extends essentially radially from a starting position, with a slight slope, toward an end position. With torsional pretensioning of the welding power cable that is produced by this movement, the aim is for this torsion to secure locking of the connection. Current conventional welding power cables typically conform to these standard specifications. However, in this approach according to the standard, it may be considered disadvantageous that connected welding power cables, solely due to the rotational movement of the cable about its longitudinal axis necessary for fastening the cable to the welding power source, are generally under a targeted, intentional torsional stress. This disadvantage applies not only for connections of a welding power cable to a welding power source, but also for any connection in a welding circuit that makes use of such a standard connection.

The object of the invention, therefore, is to provide an option for connecting and disconnecting welding power cables to/from a welding power source in a quick and reliable manner while keeping the torsional stress on a welding power cable in the area of the connection to the welding power source, in particular the risk of a torsion-related disconnection of the welding power cable from the welding power source, as low as possible.

The object is achieved based on the underlying concept of the invention, to provide a connection means on the welding power cable, which for achieving a detachable fastening to a welding power source is situated on the welding power cable, and which with regard to rotational movements is decoupled from an outer casing of the welding power cable. Thus, for a welding power cable of the type stated at the outset, to achieve the object it is proposed according to the invention that the electrical contacting means of the welding power cable and the connection means of the welding power cable are continuously rotatable relative to one another about a longitudinal axis, and the connection means situated on the outer side of the casing is provided with a bayonet element of a bayonet lock. The aim is for the connecting part to be fastenable by means of the bayonet lock device, preferably by a rotary movement, preferably solely by a rotary movement, of a handling part. However, the connecting part should preferably be slightly movable in the axial direction with respect to the outer casing of the welding power cable. At least the handling part of the connecting part, which is rotationally decoupled from the casing of the welding power cable, is preferably also axially movable in the axial direction, at least along a predefined limited path. In this way, the welding power cable in its fastened position on the welding power source may be fixedly held in the axial direction and may still be rotated about its longitudinal axis under a torsional stress, so that the cable is immediately relieved of load, even under torsional stress due to the rotation. Furthermore, in addition to a rotational movement it is also possible to make use of an axial movement, in particular an axial lifting movement, of the handling part when the bayonet connection between the welding power cable and the welding power source is established and released. The axial movement superimposed on the rotational movement may in particular be used to transfer a bayonet element of the bayonet lock device to a form-fit or force-fit locking position, and to remove it from this position in order to release the bayonet connection. In conjunction with the invention, a bayonet connection or a bayonet lock device may preferably be understood to mean a connection or device in which the welding power cable is engaged on the pole contact device or some other mating piece by at least one element of the bayonet lock device carrying out a relative rotational movement in only one rotational direction, and an axial movement. The rotational movement should preferably be less than 360° and particularly preferably less than 180°, more preferably less than or equal to 90°. The axial movement should preferably be relatively short, and is used primarily to detachably lock/engage the bayonet lock device and unlock it.

Particular advantages result from the approach according to the invention, in particular also in the fastening of the welding power cable to the welding power source. The bayonet lock device provided according to the invention for fastening the welding power cable to the welding power source has a bayonet element on the welding power cable and also on the welding power source, which may be engaged with one another. The two bayonet elements may be locked and fixed to one another in an end position by a relative rotational movement of one bayonet element with respect to the other bayonet element, which is preferably superimposed with the axial movement. To allow engagement of the two bayonet elements and the predetermined movement path of the engaged bayonet elements, the bayonet element on the power cable side and the bayonet element on the power source side should be oriented in a specific rotational position relative to one another. This may preferably be achieved by rotating the handling part of the welding power cable about its longitudinal axis by hand until it assumes a desired predetermined rotational orientation with respect to the pole contact device on the power cable side, and the two bayonet elements are aligned for engagement with one another. In previously known welding power cables, with this operation the problem may arise that continuous torsional stress may occur on the welding power cable due merely to such a connection and fastening process. The welding power cable may possibly need to be twisted even for orienting the welding power cable with respect to the pole contact device. In particular, but not exclusively, for welding power cables that are used together with welding machines, there may often be additional dynamically occurring torsional stresses on the welding power cable, which may ultimately result in breaks of the particular cable and continuous torsional stresses on the connection between the welding power cable and the welding power source. With the approach according to the invention, such torsional stresses also do not act on the bayonet connection. In addition, in the presence of and due to an operation-related torsional force acting on the cable, in the area of contact with the welding power source a welding power cable according to the invention can rotate relative to the bayonet connection and its bayonet element in order to avoid twisting of the welding power cable.

The relative rotatability of the connection means, in particular a bayonet element, with respect to the casing of the welding power cable is of particular importance in the installation of a welding power cable. This is because it is thus possible, despite the creation of a secure lock, in particular a bayonet connection, between the welding power cable and the pole contact device to avoid torsional stress on the connection and the welding power cable. The connection means, in particular the at least one bayonet element, and the casing of the welding power cable should preferably be rotationally decoupled from one another so that the casing of the welding power cable can continuously rotate relative to the connection means. This decoupling is present, in the unconnected state and also when the welding power cable is connected, preferably to a pole contact device of a welding power source, or preferably to another welding power cable. This means that the connection means and the cable or the casing of the welding power cable can rotate relative to one another, in particular also in the connected state.

In one preferred embodiment of the invention, the connection means on the welding power cable in the area of one of its end faces may have a ring-shaped actuating element on which the bayonet element on the welding power cable side is situated, and which is rotatable about the outer side of the welding power cable and relative to same. With such a configuration of the connection means of the welding power cable, particularly simple handling may be achieved in the torsion-free, relative orientation of the bayonet element of the welding power cable and in establishing and releasing the bayonet connection.

In another preferred embodiment of the invention, the connection means that is situated on the welding power cable and preferably continuously rotatable relative to the outer casing of the welding power cable (also in the connected state of the welding power cable) may have a spring element that is provided for bracing or pretensioning the bayonet element on the welding power side against the bayonet element of the welding power source. The tensioned spring element may hold a bayonet element, which is movable per se, in particular in an end position in which the bayonet element locks the bayonet lock and is detachable only when unlocked by hand.

In another preferred embodiment according to the invention, one of the bayonet elements may preferably be situated on an inner surface of the connection means facing the casing. The bayonet element on the welding power source side may preferably be formed on an outer circumferential surface of an electrical contacting means of the pole contact device. Since the connection means of the welding power cable is thus to be guided via the contacting means of the welding power source in order to establish the bayonet connection, centering or a self-aligning axial orientation of the contacting means on the welding cable side also takes place, which facilitates rapid installation.

In one particularly preferred embodiment of the invention, a welding power cable may be essentially completely freed from torsional stresses by providing the welding power cable on each of its two ends with an electrical contacting means and with a connection means of the welding cable, each being continuously rotatable relative to one another about a longitudinal axis, and the connection means, situated in each case on the outer side of the casing of the welding power cable, being provided with a bayonet element of a bayonet lock device. In this way, when torsional stresses occur on the cable situated in the welding circuit, at both ends the cable with its two contacting means may carry out rotational movements relative to its two connection means about its longitudinal axis, and thus follow the torsional forces in order to avoid twisting of the cable. At the same time, at both ends of the welding power cable the connections to the pole contact device and to the welding torch are not stressed by torsional forces, thus avoiding the risk of inadvertently detaching the connection of the bayonet connections.

The present invention is not limited to welding power cables that are or may be directly connected to a pole contact device of a welding power source. In principle, the present invention is applicable to any connection within a welding circuit with which a welding power cable is insertable into a welding circuit. Thus, for example, the welding power cable may be an extension cable that is provided on each end with an electrical contacting means and a connection means. For an extension cable for a welding power cable, the extension cable may have different connection means at its two ends. These different connection means may in particular be those that are provided on the one hand for arranging on connection means of a pole contact device, and on the other hand for arranging on the connection means of a welding power cable. This means that a preferred extension cable according to the invention should preferably have a connection means at one of its ends that is rotatably fixedly mounted with respect to the casing of the extension cable. In contrast, at its other end the extension cable should preferably have a connection means that is rotatable, preferably continuously rotatable, about its longitudinal axis with respect to the casing of the extension cable. In other words, the extension cable may be designed as a plug on one end and as a socket on the other end to form a plug/socket connection.

Further preferred embodiments of the invention result from the claims, the description, and the drawings.

The invention is explained in greater detail with reference to exemplary embodiments that are illustrated strictly schematically in the figures. In the figures:

FIG. 1 shows a perspective illustration of a welding power source for arc welding methods, with welding power cables according to the invention connected to its two pole contact devices;

FIG. 2 shows an exploded illustration of a pole contact device of the welding power source;

FIG. 3 shows a sectional illustration of a pole contact device according to FIG. 2;

FIG. 4 shows an exploded illustration of a contacting and connecting device of a welding power cable according to the invention;

FIG. 5 shows a sectional illustration of the contacting and connecting device from FIG. 4;

FIG. 6 shows a sectional illustration of a contacting and connecting device according to the invention, into which a feed device for shielding gas is integrated;

FIG. 7 shows a welding power cable, designed as an extension cable, which on its two ends is provided with a socket connector and a plug connector, in a sectional illustration, in a side view, and in a perspective illustration;

FIG. 8a shows a sectional illustration of an end section of a welding power cable according to the invention, together with a portion of a pole contact device that is matched to the welding power cable; and FIG. 8b shows a sectional illustration of an end section of another welding power cable according to the invention, together with a portion of a pole contact device that is matched to the welding power cable.

FIG. 1 shows a welding power source 1 that supplies electrical current and voltage for carrying out arc welding methods by means of an arc welding torch, not illustrated in greater detail. The welding power source 1 also contains a control device having a control panel 2 via which parameters of the particular arc welding method to be carried out may be set and the welding process may be controlled. In the present case, the welding power source 1 may be used to carry out, for example, MIG/MAG, WIG, plasma, electrode, and any other arc welding methods or high-current applications. Other arc welding and separating methods may be carried out in further possible embodiments of the invention. The preferred embodiment according to the invention, discussed below, of a welding power cable 3 and its connection to the welding power source 1 may likewise be used.

Two pole contact devices 5, 6 which are each provided for connecting a power cable 3 and which in FIG. 1 are concealed by a union nut 10 of the welding power cable 3 protrude from a housing 4 of the welding power source 1. The pole contacts of the pole contact devices 5, 6 are each designed in the form of an essentially cylindrical contact pin 7. The respective contact pin 7 is situated in a central recess in a housing part 8 of the particular pole contact device 5, 6 (FIG. 3). A contact surface is formed on an end face 7a of the particular pole contact, in the present case the contact pin 7. In particular a circumferential surface 7b of the contact pin 7, and optionally the end face 7a, may be provided for electrically conductive contact with one or more contact elements, for example contact strips not illustrated in greater detail, on the welding power cable side. Since the overall contact pin 7 is made of an electrically conductive material, in particular copper or a copper alloy, it is capable of being an electrically conductive contact partner on its entire outer shell or circumferential surface. The housing part 8 is designed with sections having different diameters; section 8a, with the largest diameter, is situated approximately centrally in relation to a longitudinal axis of the housing part 8. This section, in the direction toward the housing of the welding power source, is adjoined by another section 8b having a smaller diameter than the first section 8a. A third section 8c is provided for encompassing a union nut 10 on the power cable side (FIG. 4) on this third section 8c. A rear housing part 11, which in the exemplary embodiment is designed in the form of a cap, is situated on the second section 8b. The contact pin 7 is detachably fastened to the housing part 8 via the rear housing part 11 and further fastening means 12.

The end face 7a is formed on an end section of the contact pin 7 having a smaller diameter than the section of the contact pin 7 preceding it. This preceding section is thus used as a stop for positioning the contact pin 7 in the housing part 8.

The housing part 8 on its outer circumferential surface of the third section 8c has two identical grooved recesses 14, having an at least approximately constant depth and width, that are offset relative to one another by 180° on the circumference and that extend along a portion of the circumference of the section 8c. The grooved recesses 14 are open at the end face 15 of the housing part, and initially extend approximately in parallel to the longitudinal axis of the housing part 8. In the further extension of the grooves 14, the grooves 14 each move with an extension component in the circumferential direction, also toward the section 8a having the larger diameter, and then, likewise with an extension component in the circumferential direction, once again approach the end face 15 of the housing part 8. In the preferred embodiment, the section of the grooves 14 also extending in the circumferential direction has an approximate V shape, wherein the two legs of the approximate V shape have components with at least approximately the same length in the axial direction, but have components with different lengths in the radial direction.

As illustrated in FIG. 4, the welding power cable 3 on its end with slightly stripped insulation on the welding power source side is provided with a contacting and connecting device 17. A wire end ferrule 18 of the contacting and connecting device 17 is pushed onto the litz wires of the stripped cable 3. The wire end ferrule 18 is enclosed by a contact socket 19 that is provided as a contacting means of the welding power cable; for this purpose, the wire end ferrule 18 is situated in a blind hole 19a in the contact socket 19 provided on the end-face side. The contact socket 19 also has a blind hole 19b on its other end face on the power source side. An end face of this blind hole 19b has a central peg 20 via which the contact pin 7, provided for arrangement in the blind hole, is centered.

The contact socket 19 on its outer, at least essentially cylindrical circumferential surface has two blind hole recesses 21 (FIG. 5) that are situated between the two blind holes 19a, 19b, viewed in the longitudinal direction. In addition, the contact socket 19 on its outer circumferential surface has a shoulder 22 that is situated between the blind hole recesses 21 and the end of the contact socket on the power source side, once again viewed in the longitudinal direction. The contact socket 19 together with the wire end ferrule 18 is clamped to the stripped welding power cable 3 by means of two grub screws 23.

An electrically nonconductive insulating sleeve 25 is pushed onto the metallic contact socket 19, which is preferably made of copper or copper alloys. In its end position on the contact socket 19, the insulating sleeve 25 with one end face extends almost to the blind hole recesses 21 of the contact socket 19, and with its other end face extends to the end of the contact socket 19 on the power source side. On its inner wall delimiting the recess of the insulating sleeve 25, the inner wall is provided with a shoulder 26 that corresponds to the shoulder 22 of the outer surface of the contact socket 19, so that insertion of the contact socket 19 into the insulating sleeve 25 is limited by the shoulder 26 of the insulating sleeve 25. The insulating sleeve 25 rests against the outer surface of the contact socket 19, in the area of the shoulder 22 and also on both sides of the shoulder 22, viewed in the longitudinal direction. The insulating sleeve 25 on its outer circumferential surface is provided with a ring-shaped flange 27 that is situated at a distance from the end on the welding cable side.

For handling the welding power cable 3, it is provided with a handle sleeve 29 as an integral part of the handling device. The handle sleeve 29 is clamped onto the contact socket 19 and onto the welding power cable 3. The handle sleeve 29 encloses a portion of the contact socket 19 as well as an end section of the welding power cable 3. The handle sleeve 29 has two grip plates 29a, 29b that are joined together by means of a click connection. For this purpose, the two grip plates 29a, 29b are provided with multiple detent hooks 30 and recesses 31. The detent hooks 30, which are connected in one piece to each of the grip plates 29a, 29b, are provided for engaging and locking with each of the recesses 31. In the area of one of its ends, the handle sleeve has a circumferential groove on its inner surface, into which a sealing ring 32, which with its inner surface rests against an outer protective and insulating sleeve (casing) 3a of the welding power cable 3, is inserted.

On its other end face, the handle sleeve 29 on its inner surface is provided with a cutout 35 in the inner wall. The inner wall rests on an end area of the outer surface of the insulating sleeve 25, whereas the boundary surface of the handle sleeve 29 resulting from the cutout overlaps a shoulder 10a of the outer circumferential surface of the union nut 10, which is situated in the area of the end of the union nut 10 on the welding power cable side and has a smaller diameter than the remaining circumferential surface of the essentially hollow cylindrical union nut 10. As is apparent in particular in FIG. 4, the union nut 10 on its otherwise smooth inner surface has two identical cams 36 that are offset relative to one another by 180° on the circumference, and whose size is matched to the height and width of the grooves 14 in the housing part 8 in such a way that the cams 36 are situated in the grooves 14 and can be moved very smoothly. The cams 36 are situated on the inner surface 10b of the union nut at a small distance from the end of the union nut 10 on the end-face side and on the welding power source side. In the area of its end on the welding power cable side, the union nut 10 on its inner surface has a shoulder with respect to an area having a first reduced diameter, which is adjoined by a second area having an even smaller diameter.

As is apparent in particular in FIG. 5, a spring element 39 rests against the inner ring-shaped end face 38 that is formed by the diameter reductions, and is supported with one of its two ends on this inner end face 38. Since the union nut 10 is pushed onto the insulating sleeve 25, the spring element 39 with its other end rests against the flange 27 of the insulating sleeve 25. Due to the fact that the insulating sleeve 25 is fixed to the contact socket 19 in the axial direction, but the union nut 10 in the axial direction is movable back and forth between the handle sleeve 29 and the flange 27 of the insulating sleeve 25 in the axial direction, against the elastic force of the spring element 39, the spring element 39 may be compressed by an axial movement of the union nut 10. As a result of the elastic force of the compressed spring element 39, the union nut 10 may likewise be moved toward the handle sleeve in the axial direction in order to ensure securing seating in the bayonet in the locked position.

The welding power cable 3 may be manually handled on its handle sleeve 29 in order to connect the welding power cable 3 to the welding power source 1 or some other welding power source. For this purpose, the contact socket 19 on the contact pin 7 that protrudes from the union nut 10 is to be led from one of the pole contact devices 5, 6 of the welding power source 1. The contact socket 19 is then guided over the contact pin 7 via the blind hole 19b. The union nut 10, which is rotatable about its longitudinal axis, may now likewise be oriented via the cams 36 by manual manipulation in such a way that the cams 36 are situated in front of the end face of the housing part 8 in the axial direction, and at the inlets of the grooves 14 in the rotational direction. The cams 36 may now be inserted into the grooves 14 by a movement parallel to the longitudinal axis. The spring element 39 is thus tensioned. The particular cam 36 may be guided in the particular groove 14 along its further course. After the particular cam 36 has left the section of the particular groove 14 parallel to the longitudinal axis, the cam is guided into the approximately V-shaped section of the groove 14, in which the cam 36 carries out a movement with a component in the circumferential direction and a component parallel to the longitudinal axis. The union nut 10 is hereby moved in the circumferential direction, and at the same time initially undergoes a further lifting movement against the elastic force of the spring element 39. After the particular cam 36 has reached the vertex of the V shape of its course of movement, during the rotational movement and the simultaneous slight lifting movement parallel to the longitudinal axis the spring element is slightly relieved of load, but now in the opposite direction, away from the handle sleeve 29. The bayonet connection between the union nut 10 of the welding power cable 3 and the housing part 8 of the welding power source 1 is now established. The section of the V shape that the cam 36 first leaves, i.e., the section extending between the axially parallel section of the groove and the vertex of the V shape, has a lower slope than the second section of the V shape, at least with an approximately equal length in the axial direction. This requires a smaller force for transferring the cam 36 into its detent position than for transferring the cam 36 from its detent position. Additional security against inadvertently detaching the bayonet connection may be achieved with this structural design.

This connection between the welding power cable 3 and one of the pole contact devices 5, 6 of the welding power source 1 may now be detached only by application of force against the pretensioned spring element 39 and simultaneous rotational movement in what is now the opposite rotational direction, in the direction of the circumference of the housing part 8.

FIG. 6 shows another exemplary embodiment of a welding power cable 3 according to the invention. In this embodiment, a media supply 42 for a shielding gas such as argon, $CO_2$, or a mixed gas, which opens into a central recess 46 in the welding power cable is integrated into the welding power cable 3 directly behind the bayonet connection and behind the union nut 10 and also behind the blind hole recesses 21 in the handle sleeve 29. Except for this aspect, the welding power cable from FIG. 6 corresponds to the one shown in FIGS. 2 through 5 and the discussed welding power cable, and in particular also the bayonet connection between the welding power cable and the welding power source that is established together with a welding power source. Therefore, only the differences from the embodiment according to FIGS. 2 through 5 are discussed below.

A plate 29a, 29b of the two-part handle sleeve 29 is provided with a passage 43 that extends through the wall of the handle sleeve, and to which a feed line 44 coming from the outside is connected. This passage 43 leads through the handle sleeve 29 into a blind hole 45 in the contact socket 19. The blind hole 45 in turn leads into a central recess 46 via which the welding power cable 3 in this embodiment according to the invention is provided, from the media supply to its other end. The welding power cable 3 in this embodiment also has electrically conductive copper litz wires 47 that are situated in the cable, coaxially with respect to the recess 46, and that with one end are inserted into a corresponding recess in the contact socket 19 and situated in same. The copper litz wires 47 are in turn enclosed by a likewise centrally provided insulating sleeve or casing 48 of the welding power cable. With this welding power cable 3, by means of the contact socket 19 it is thus possible to transmit current and voltage of the welding power source to a welding torch or to a device situated in the welding circuit, and to supply a shielding gas to the welding torch. A detachable connection between the welding power source and the welding power cable may be established with a bayonet connection that is identical to the exemplary embodiment in FIGS. 2 through 5, whose components on the welding power cable side, namely, according to the invention the union nut 10 and its cams 36, are decoupled from the welding power cable 3 itself for rotational movements and stresses. The welding power cable 3 is thus also decoupled from relative rotational movements of the union nut 10, primarily and in particular when the welding power cable is situated in the welding circuit and is connected to a mating piece, for example to another welding power cable or to a pole contact device of a welding power source or a wire feed device. It is thus possible to carry out continuous rotational movements between the union nut 10 and the handle sleeve or the casing of the welding power cable. In this regard, reference is made to the corresponding figures and descriptions for FIGS. 1 through 5.

FIG. 7 shows another preferred exemplary embodiment of the invention. This involves a welding power cable that is designed as an extension cable 50. Such an extension cable 50 may be provided, for example, to lengthen a welding power cable as shown in FIG. 4. One example of an application for such an extension cable 50 may be that the welding power cable from FIG. 4 is too short to connect a welding power source to a component of a welding circuit. An extension cable 50 may then be used to bridge a fairly large distance between a pole contact device 5, 6 of a welding circuit component, for example an arc welding torch. For this purpose, the extension cable 50 on one of its ends has a plug connector 51 whose geometry and shape correspond to the plug part of the pole contact device, as illustrated in FIGS. 2 and 3. The plug connector 51 essentially corresponds to the housing part 8 and the contact pin 7 of the pole contact device from FIGS. 2 and 3. On the end of the cable and in the area of the plug connector 51, the extension cable 50 is also provided with a handle sleeve 52 that has two joined-together grip plates and has a design similar to the handle sleeve 29 from FIGS. 4 and 5. The handle sleeve 52, which is clamped onto the casing of the welding power cable, on its end face grips the housing part 53 of the plug connector 51 and nonrotatably fixes it to the casing in relation to the casing of the extension cable 50.

The contact pin 107 of the plug connector 51 on its cable-side end face has a recess 54 in which the stripped end of the cable is situated, and which by means of a wire end ferrule and screws is clamped to the contact pin 107. The other end of the contact pin 107 protrudes into the housing part 53, so that the housing part 53 concentrically surrounds the contact pin 107. The end of the contact pin 107 is recessed only slightly with respect to the end face 58 of the housing part 53.

On its other end, the extension cable 50 is provided with a socket connector 60 that corresponds to the socket connector of the welding power cable from FIGS. 4 and 5. In particular, the union nut 110 used here as well as the handle sleeve 129 and the contact socket 119 are identical to the corresponding components from the exemplary embodiment according to FIGS. 4 and 5. Here as well, the union nut 110 is rotatable relative to the casing of the extension cable 50. As is apparent form FIG. 7, the contact socket 119 protrudes beyond the end face of the union nut 110 of the plug connector, as in the exemplary embodiment according to FIGS. 4 and 5. In the area of the end face that protrudes beyond the union nut, the contact socket 119 has a blind hole 119*a*, on the end face of which a peg 120 is formed.

FIGS. 8*a*, 8*b* show end areas of two welding power cables 65, 66, respectively, each of which is provided with a respective socket connector 67, 68. The socket connector 67 in FIG. 8*a* corresponds completely to the socket connector from FIGS. 4 and 5. The socket connector 68 in FIG. 8*b* differs with regard to the geometric shape of the end face of its blind hole 69 in the contact socket 71. In contrast to the contact socket 70 from FIG. 8*a*, in the contact socket 71 the cylindrical peg 73 is provided with a greater length in the axial direction and has a smaller diameter than the peg 20 from FIG. 5 and the peg from FIG. 8*a*. In both embodiments in FIGS. 8*a* and 8*b*, the particular union nut is continuously rotatable relative to the casing of the welding power cable.

A plug connector 77, 78 is associated with each of the two contact sockets 70, 71, the respective contact pin 79, 80 of the plug connector having a design that is congruent with the associated contact socket 70, 71. In particular, the recess 79*a*, 80*a* in the respective contact pin 79, 80, introduced at the free end face, is adapted with respect to length and diameter to the geometric shape of the particular peg 72, 73. As a result, it is possible to insert each of the two socket connectors 67, 68 at its associated plug connector 77, 78 only in a position in which the cam of the respective union nut can be inserted into the groove in the housing part and transferred to the particular detent position. These socket/plug connectors are thus coded, so that it is not possible to mix up the plug connectors with the respective socket connectors of the other type. If each of the two pole contact devices is provided with one of the two, and thus different, socket connectors, mistaking the ground welding power cable and the welding power cable for the positive pole of the welding power source may be precluded when connected to the particular pole contact device 5, 6.

LIST OF REFERENCE NUMERALS

| | |
|---|---|
| 1 | welding power source |
| 2 | control panel |
| 3 | welding power cable |
| 3a | protective and insulating sleeve |
| 4 | housing |
| 5 | pole contact devices |
| 6 | pole contact devices |
| 7 | contact pin |
| 7a | end face |
| 7b | circumferential surface |
| 8 | housing part |
| 8a | first section |
| 8b | second section |
| 8c | third section |
| 9 | |
| 10 | union nut |
| 10a | shoulder |
| 10b | inner surface |
| 11 | rear housing part |
| 12 | fastening means |
| 13 | |
| 14 | grooved recess |
| 15 | end face |
| 16 | |
| 17 | contacting and connecting device |
| 18 | wire end ferrule |
| 19 | contact socket |
| 19a | blind hole |
| 19b | blind hole |
| 20 | peg |
| 21 | blind hole recess |
| 22 | shoulder |
| 23 | grub screw |
| 24 | |
| 25 | insulating sleeve |
| 26 | shoulder |
| 27 | flange |
| 28 | |
| 29 | handle sleeve |
| 29a | grip plate |
| 29b | grip plate |
| 30 | detent hook |
| 31 | recess |
| 32 | sealing ring |
| 33 | |
| 35 | cutout |
| 36 | cam |
| 37 | end face |
| 38 | end face |
| 39 | spring element |
| 42 | media supply |
| 43 | passage |
| 44 | feed line |
| 45 | blind hole |
| 46 | central recess |
| 47 | copper litz wires |
| 48 | insulating sleeve |
| 50 | extension cable |
| 51 | plug connector |
| 52 | handle sleeve |
| 53 | housing part |
| 54 | recess |
| 58 | end face |
| 60 | socket connector |
| 65 | welding power cable |
| 66 | welding power cable |
| 67 | socket connector |
| 68 | socket connector |
| 69 | blind hole |
| 70 | contact socket |
| 71 | contact socket |
| 72 | peg |
| 73 | peg |
| 77 | plug connector |
| 78 | plug connector |
| 79 | contact pin |
| 79a | recess |

-continued

| | |
|---|---|
| 80 | contact pin |
| 80a | recess |
| 107 | contact pin |
| 110 | union nut |
| 119 | contact socket |
| 119 | blind hole |
| 120 | peg |

The invention claimed is:

1. A welding power cable, in particular for use in a welding circuit, that includes at least one welding power source, a welding torch, and a workpiece, the welding power cable being provided with an outer casing for protecting and insulating an electrically conductive cable, wherein the electrically conductive cable is situated within the casing, and the end face of the welding power cable is provided with an electrically conductive contacting means for establishing an electrically conductive contact with the welding power source in particular, and a connection means for establishing a detachable mechanical connection, in particular between the welding power source and the welding power cable, characterized in that
the electrical contacting means and the connection means of the welding power cable are continuously rotatable relative to one another about a longitudinal axis, and the connection means situated on the outer side of the casing is provided with a bayonet element of a bayonet lock device.

2. The welding power cable according to claim 1, characterized in that the connection means annularly encloses the casing.

3. The welding power cable according to claim 1, characterized in that the bayonet element is situated on an inner surface of the connection means facing the casing.

4. The welding power cable according to claim 1, characterized in that the contacting means situated on the end face of the welding power cable has a smaller radial extension than an inner surface of the ring-shaped connection means.

5. The welding power cable according to claim 1, characterized by a spring element that is provided on the connection means and that is continuously rotatable relative to the casing, and that is provided for bracing the bayonet element with a mating piece of the bayonet lock device.

6. The welding power cable according to claim 1, characterized in that the welding power cable on each of its two ends is provided with an electrical contacting means and with a connection means of the welding cable that are continuously rotatable relative to one another about a longitudinal axis, and the connection means, situated in each case on the outer side of the protective and insulating sleeve, is provided with a bayonet element of the bayonet lock.

7. A welding power cable connection system, comprising a connection device on the welding power source side for mechanical connection and for electrically conductive contacting with a welding power cable, having a contacting element for establishing an electrically conductive contact with a pole contact device of the welding power source, and a connection means for establishing a detachable mechanical connection with the pole contact device, characterized by a welding power cable according to claim 1, and having a bayonet element on the welding power source side, wherein the bayonet element of the welding power cable and the bayonet element on the welding power source side are designed for mutual engagement.

8. The welding power cable connection system according to claim 7, characterized by a connection means on the welding power source side, which on an outer circumferential surface of the pole contact device is provided with the bayonet element on the welding power source side.

9. The welding power cable connection system according to claim 7, characterized in that the connection means for establishing the detachable mechanical connection has a grooved recess as a bayonet element.

10. The welding power cable connection system according to claim 9, characterized in that the connection means for establishing the detachable mechanical connection has a peg-shaped element as the bayonet element, whose geometric size and shape are designed in such a way that the peg-shaped element is displaceable in and along the grooved recess.

11. The welding power cable connection system according to claim 7, characterized by two connection devices and two welding power cables, wherein the connection devices and the welding power cables are coded in such a way that, due to geometrically different shapes, each of the connection devices is electroconductively connectable and detachably lockable to only one of the two welding power cables in each case.

* * * * *